(12) United States Patent
Ho et al.

(10) Patent No.: US 12,335,320 B2
(45) Date of Patent: *Jun. 17, 2025

(54) TECHNIQUES FOR AUTOMATIC CROSS-DEVICE MEETING AUTHENTICATION

(71) Applicant: Google LLC, Mountain View, CA (US)

(72) Inventors: Ronald Ho, Sunnyvale, CA (US); Christopher Paul David Johnson, Mountain View, CA (US)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/608,861

(22) Filed: Mar. 18, 2024

(65) Prior Publication Data

US 2024/0223622 A1 Jul. 4, 2024

Related U.S. Application Data

(63) Continuation of application No. 18/144,835, filed on May 8, 2023, now Pat. No. 11,936,695, which is a continuation of application No. 17/402,891, filed on Aug. 16, 2021, now Pat. No. 11,647,057, which is a continuation of application No. 14/976,298, filed on Dec. 21, 2015, now Pat. No. 11,165,832.

(51) Int. Cl.
*H04L 65/1069* (2022.01)

(52) U.S. Cl.
CPC .............................. *H04L 65/1069* (2013.01)

(58) Field of Classification Search
CPC . H04L 63/102; H04L 65/403; H04L 65/1086; H04W 12/08
See application file for complete search history.

(56) References Cited

U.S. PATENT DOCUMENTS

| | | | |
|---|---|---|---|
| 7,606,560 | B2 | 10/2009 | Labrou et al. |
| 8,850,522 | B2 | 9/2014 | Vakil et al. |
| 8,863,202 | B2 | 10/2014 | Agnihotri et al. |
| 2003/0101343 | A1 | 5/2003 | Eaton et al. |
| 2013/0080916 | A1 | 3/2013 | Lopez et al. |
| 2013/0179491 | A1 | 7/2013 | Bennett et al. |
| 2013/0205380 | A1 | 8/2013 | Avni et al. |
| 2014/0109210 | A1 | 4/2014 | Borzycki et al. |

(Continued)

*Primary Examiner* — Anh Nguyen
(74) *Attorney, Agent, or Firm* — Lowenstein Sandler LLP

(57) ABSTRACT

Technology for automatic cross-device meeting authentication. An example method involving initializing, by a mobile computing device, a real-time meeting communication session; receiving information indicative of the mobile computing device being in a physical presence of the first computing device, causing the mobile computing device at the physical location of the first computing device to display a user interface element, which when selected allows the participation of the user in the real-time meeting communication session to continue via the mobile computing device of the user at the physical location of the first computing device, granting control of the real-time meeting communication session to the first computing device from the mobile computing device of the user at the physical location of the first computing device, and allowing the user to participate in the real-time meeting communication session at the physical location of the first computing device upon a user selection of the user interface element.

20 Claims, 4 Drawing Sheets

(56) References Cited

U.S. PATENT DOCUMENTS

| | | |
|---|---|---|
| 2014/0223518 A1 | 8/2014 | Feng et al. |
| 2015/0143442 A1* | 5/2015 | McCoy .............. H04N 21/4122 |
| | | 725/110 |
| 2016/0227161 A1* | 8/2016 | Jing .................... H04L 65/1046 |
| 2016/0253629 A1* | 9/2016 | Fonzi ...................... H04W 4/14 |
| | | 705/7.19 |
| 2017/0251515 A1 | 8/2017 | Altman et al. |

\* cited by examiner

TECHNIQUES FOR AUTOMATIC CROSS-DEVICE MEETING AUTHENTICATION

The present application is a continuation of co-pending U.S. patent application Ser. No. 18/144,835, filed May 8, 2023, which is a continuation of U.S. patent application Ser. No. 17/402,891, filed Aug. 16, 2021, now U.S. Pat. No. 11,647,057, which is a continuation of U.S. patent application Ser. No. 14/976,298, filed Dec. 21, 2015, now U.S. Pat. No. 11,165,832, each of which is incorporated herein by reference.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Users can participate in real-time communication sessions or "virtual meetings" via their computing devices. In a typical scenario, a plurality of users can participate in a real-time communication session where at least some of the users are co-present in a same room. The room may have a single media system that is shared and can be controlled by users via authenticated computing devices. For example, slide presentations can be shown on a display of the media system. Some users, however, may have more than one computing device. For example, a particular user may have a mobile phone as well as a tablet computer or laptop computer. Only one of these computing devices, however, may be able to be quickly and easily authenticated by the media system, such as via a particular communication medium (e.g., Bluetooth). The user, therefore, may be unable to control the media system using their second computing device.

SUMMARY

A computer-implemented technique, a server, and a non-transitory computer-readable medium are presented. The server can include a memory (e.g., the computer-readable medium) having a set of instructions stored thereon that, when executed by one or more processors of the server, cause the server to perform the technique. The technique can include initializing, by the server and with a first computing device, a real-time communication session, wherein the first computing device is connected to a media system. The technique can include receiving, by the server and from at least one of the first computing device and a mobile computing device, authentication information for a user associated with the mobile computing device, the authentication information being indicative of the mobile computing device being in short-range wireless communication with the first computing device. The technique can include associating, by the server, the user with the real-time communication session. The technique can include detecting, by the server, that a second computing device that is associated with the user is logged into a same account as the mobile computing device. The technique can also include in response to the associating and the detecting, transmitting, from the server and to the second computing device, instructions that cause the second computing device to display a user interface element associated with the real-time communication session.

A mobile computing device is also presented. In one implementation, the mobile computing device can include a memory configured to store a set of instructions, a communication device configured to transmit and receive information, and one or more processors configured to execute the set of instructions, which causes the one or more processors to perform operations. In one implementation, the operations can include establishing, by the communication device, short-range wireless communication with a first computing device that is connected to a media system, and in response to establishing the short-range wireless communication, coordinating the transmission of authentication information, from at least one of the transceiver and the first computing device, to a server, wherein the authentication information is for a user associated with the mobile computing device. In one implementation, receipt of the authentication information can cause the server to associate the user with a real-time communication session, detect that a second computing device that is associated with the user is logged into a same account as the mobile computing device, and in response to the associating and the detecting, transmit, to the second computing device, instructions that cause the second computing device to display a user interface element associated with the real-time communication session.

In some embodiments, the technique can further comprise receiving, by the server and from the second computing device, an input corresponding to a selection by the user of the user interface element.

In some embodiments, receipt of the input can cause the server to enable the second computing device to participate in the real-time communication session and control the media system.

In some embodiments, the mobile computing device is associated with an access control list (ACL) of the first computing device.

In some embodiments, the second computing device is not configured for communication with the first computing device via short-range wireless communication.

In some embodiments, the mobile computing device is a mobile phone and the second computing device is a tablet computer or laptop computer.

In some embodiments, the media system comprises a non-smart display, and wherein the first computing device is coupled to the non-smart display.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
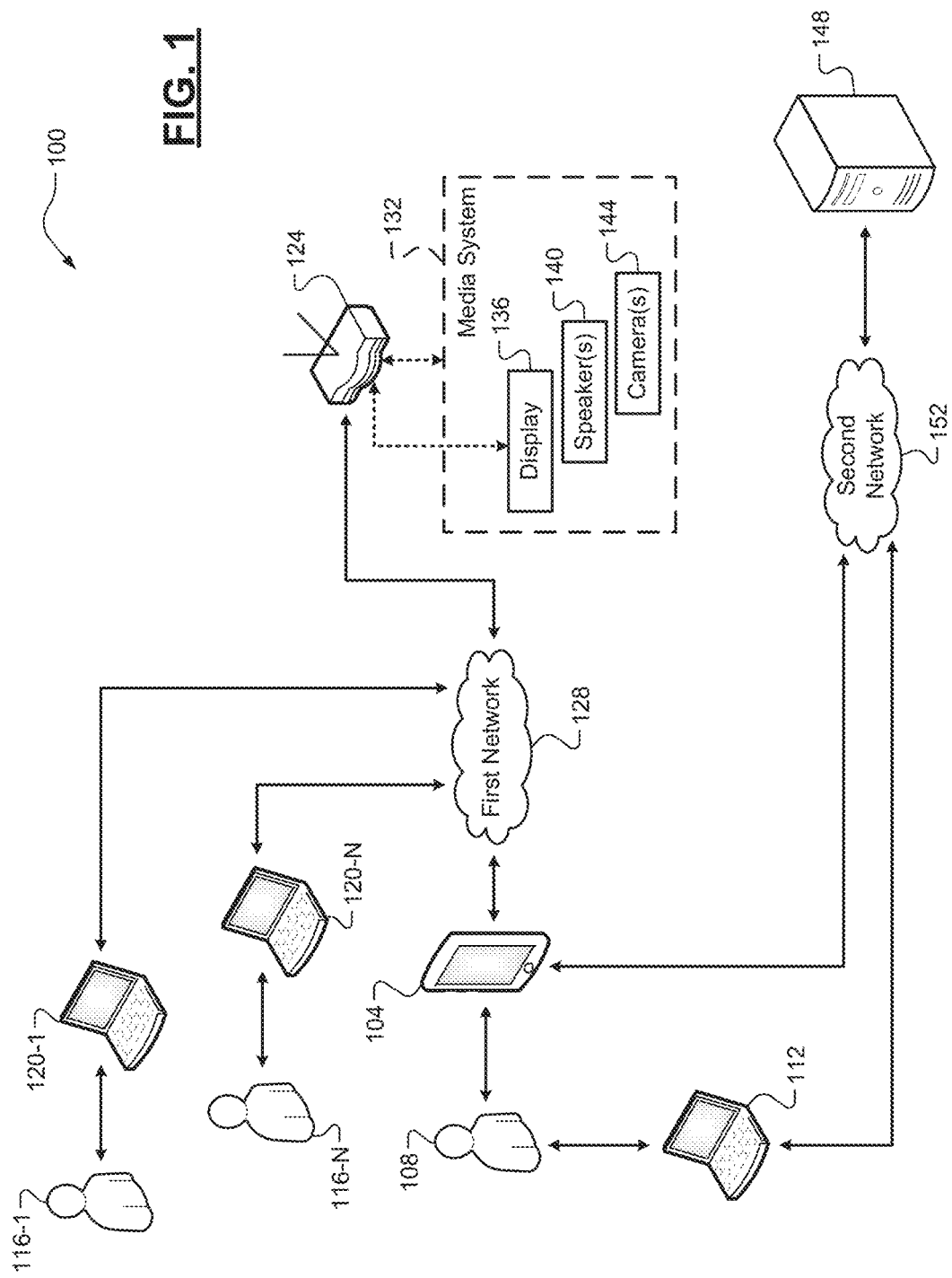
FIG. 1 is a diagram of an example computing system including an example computing device and an example server and according to some implementations of the present disclosure.

As previously discussed, a user may have multiple computing devices (e.g., a mobile phone as well as a tablet computer or laptop computer), but only one of their computing devices may be configured for quick and easy authentication for a particular real-time communication session or "virtual meeting." In one implementation, one of their computing devices can be pre-authenticated, such as via an electronic invitation that adds the computing device as an access control entity (ACE) in an access control list (ACL). For example, when the user enters a room, their pre-authenticated computing device can be detected and invited to join the real-time communication session, such as via a short-range wireless communication medium (e.g., Bluetooth). This invitation can grant the computing device permission to control an associated media system (a display, speaker(s), camera(s), etc.).

Once the user gets situated in the room, however, they may wish to utilize their other (or "second") computing device to participate in the real-time communication session. For example only, they may sit down and unpack their laptop computer or tablet computer, which they may prefer to utilize during the real-time communication session due to its larger user interface. Achieving authentication of this second computing device, however, can be a difficult and time consuming process, which may interrupt the real-time communication session. For example, the user may be required to complete a time consuming authentication process, such as Bluetooth pairing with the media system or scanning a text code or barcode (e.g., a quick response, or QR code). Moreover, in some cases, this second computing device may be unable to communicate via the short-range wireless communication medium.

Accordingly, techniques are presented for automatic cross-device meeting authentication. The term "meeting" as used herein can refer to any real-time communication session or "virtual meeting" participated in by at least one user via one or more of their computing devices. When a user enters a room, her/his mobile computing device (e.g., a mobile phone) may communicate with a first computing device associated with a media system. For example, the first computing device may be a computing device that is wired or wirelessly connected to the media system. In some implementations, this communication can occur via a short-range wireless communication medium, such as Bluetooth or WiFi Direct. The mobile computing device may be pre-authenticated (e.g., listed as an ACE in an ACL) and thus the mobile computing device can join the real-time communication session and be granted control of the media system. Thus, the techniques can provide for loosened meeting access controls by leveraging co-presence in the same room. These techniques are also performed automatically and therefore seamless to the user.

The mobile computing device may then transmit information via another computing network (e.g., the Internet) to a remote server that is associated with a user account. The mobile computing device can be currently logged into the user account. Upon receiving the information, the remote server can then communicate with the user's second computing device (e.g., a laptop computer or tablet computer). This second computing device can also be logged into the user account, and thus can be authenticated for the real-time communication session. In other words, the co-presence of both computing devices in the room with the media system is being leveraged to authenticate the second computing device. The second computing device can then join and be granted control of the media system. In some implementations, this enabling can include automatically configuring communication between the second computing device and the first computing device via the short-range wireless communication medium. Alternatively, the second computing device can connect to the real-time communication session via the other computing network (e.g., the Internet) or via the mobile computing device.

Referring now to FIG. 1, a diagram of an example computing system 100 is illustrated. The computing system 100 can be configured to implement a real-time communication session or "virtual meeting" amongst a plurality of users via their computing devices. The computing system 100 can include an example mobile computing device 104 and an example server 148 according to some implementations of the present disclosure. While the mobile computing device 104 is shown to be a mobile phone, the mobile computing device 104 can also be another suitable mobile computing device, such as a tablet computer, a laptop computer, or a wearable computing device such as eyewear or clothing that incorporates a computer. The mobile computing device 104 can be associated with a user 108. The user 108 may also have another computing device 112 (also referred to as "second computing device 112"), such as a different mobile computing device than mobile computing device 104 (a laptop computer, a tablet computer, etc.).

Optionally, other users 116-1 . . . 116-N (N≥1; collectively "other users 116") may also participate in a real-time communication session, either in person or via their computing devices 120-1 . . . 120-N (collectively "other computing devices 120"). The mobile computing device 104 can directly communicate with first computing device 124, such as via a short-range wireless communication network 128 (hereinafter "first network 128"). For example, the first network 128 may be Bluetooth or WiFi Direct. In some implementations, the first computing device 124 can be coupled to a display 136 of a media system 132 and thus can act as a wireless access point. In such implementations, the display 136 can be a non-smart display, i.e., a display that is not itself configured to connect to the first network 128. The media system 132 can be associated with a physical conference or meeting room. Other example components of the media system 132 include a set of speakers 140 and a set of cameras 144.

Using the media system 132, users that are physically present in the room are able to participate in a real-time communication session, which may or may not include other remote users. For example only, the users in the real-time communication session may control the display 136 to show a slide presentation. Sound and/or camera control can similarly be performed. In order to participate in and control the media system 132, however, a particular computing device may need to be authenticated. The mobile computing device 104 can also be configured to communicate with the remote server 148 via another network 152 (hereinafter "second network 152"). The second network 152 can include a local area network (LAN), a wide area network (WAN), e.g., the Internet, or a combination thereof. The second computing device 112 can also be configured to communicate with the server 148 via the second network 152.

Figure 2:
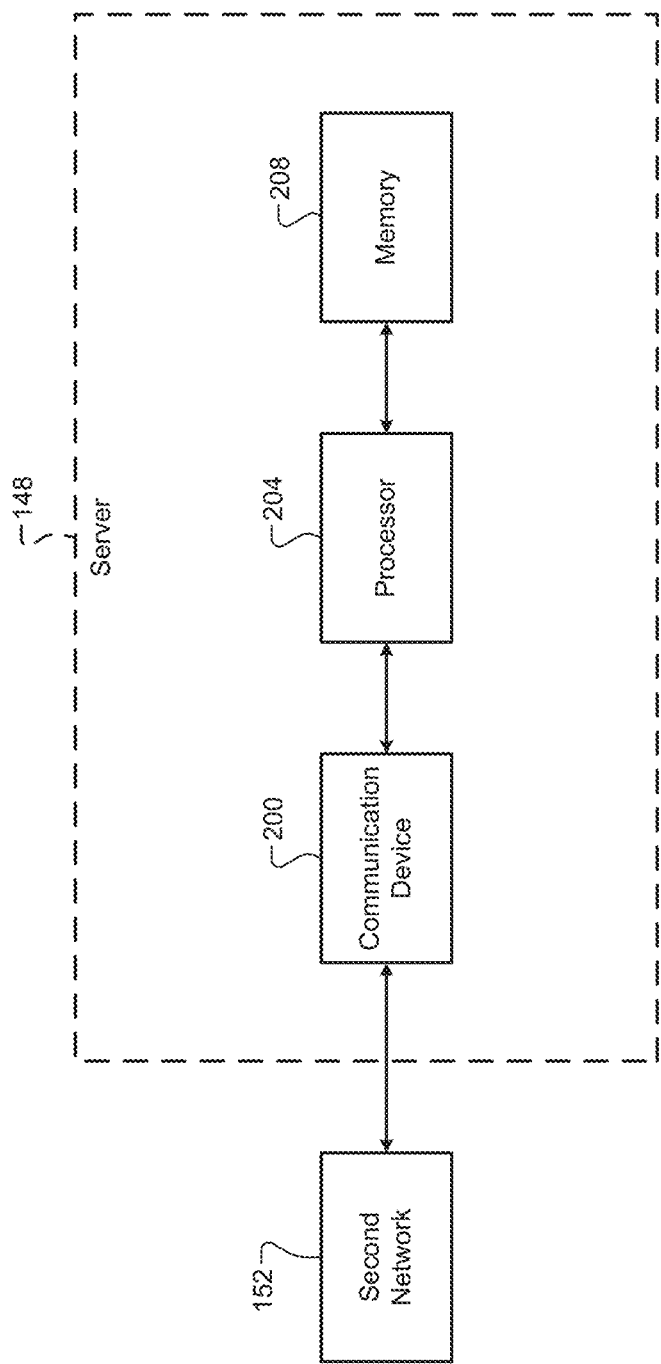
FIG. 2 is a functional block diagram of the example server of FIG. 1.

Referring now to FIG. 2, a functional block diagram of the example server 148 is illustrated. The server 148 can include a communication device 200, a processor 204, and a memory 212. The processor 204 can control operation of the server 148, including implementing at least a portion of the techniques of the present disclosure. The term "processor" as used herein can refer to both a single processor and multiple processors operating in a parallel or distributed architecture. The communication device 200 can be configured for communication with other devices (e.g., the second computing device 112) via the second network 152. One non-limiting example of the communication device 200 is a transceiver. The memory 208 can be any suitable storage medium (flash, hard disk, etc.) configured to store information. For example, the memory 208 may store a set of instructions that are executable by the processor 204, which cause the server 148 to perform at least a portion of the techniques of the present disclosure. It will be appreciated that the example mobile computing device 104 can include the same or similar components as the server 148, and thus can be configured to perform at least a portion of the techniques of the present disclosure, which are described more fully below.

In one example scenario, the user 108 enters a room having the media system 132. The media system 132, as previously discussed, is connected to the first computing device 124 (e.g., a computing device). For example, the real-time communication session may already be occurring and the media system 132 could be under the control of other users 116 via their computing devices 120 and the first computing device 124. When the user 108 enters the room, her/his mobile computing device 104 can automatically detect the presence of the first computing device 124. This detection, for example, can occur via the short-range wireless communication (first) network 128. Once detected, the mobile computing device 104 can automatically transmit authentication information to the first computing device 128. For example, the authentication information can include a unique identifier, which may correspond to a particular ACE in an ACL at the first computing device 124. The first computing device 124 can then respond to the mobile computing device 104 via the first network 128, thereby enabling the mobile computing device 104 to join the real-time communication session, as well as granting the mobile computing device 104 permission to control the media system 132. In the meantime, the user 108 may sit down at a table in the room, and unpack her/his second computing device 112.

As previously discussed, however, the other (or "second") computing device 112 may be unable to communicate with the first computing device 124 via the first network 128. Thus, after being authenticated and allowed to join the real-time communication session, the mobile computing device 104 can automatically transmit information (meeting information, authentication information, etc.) to the server 148 via the other computing (second) network 152 (e.g., the Internet). Receipt of this information can cause the server 148 to communicate with the second computing device 112 to authenticate the second computing device 112. In one example, this authentication includes determining whether the second computing device 112 is simultaneously logged into a same user account as the mobile computing device 104. Once authenticated, the second computing device 112 can then join the real-time communication session. This can occur via the second network 148 (e.g., via the mobile computing device 104) or by configuring the second computing device 112 for communication with the first computing device 124 via the first network 128. In some implementations, the server 148 can provide the second computing device 112 with a user interface element that, when selected by the user 108, causes the server 148 to enable the second computing device 112 to participate in the real-time communication session and control the media system 132.

Figure 3:
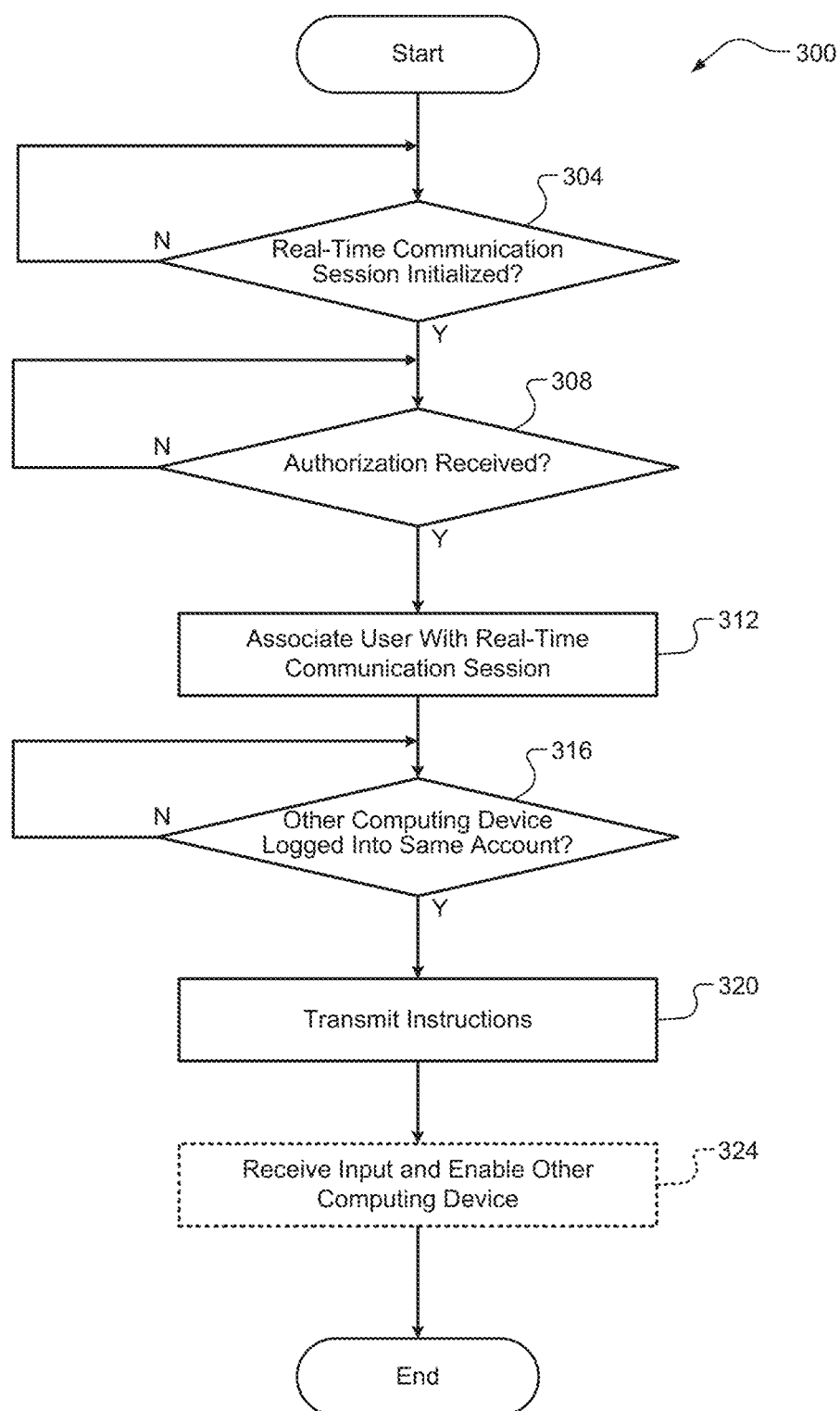
FIG. 3 is a flow diagram of an example technique for automatic cross-device meeting authentication according to some implementations of the present disclosure.
Figure 4:
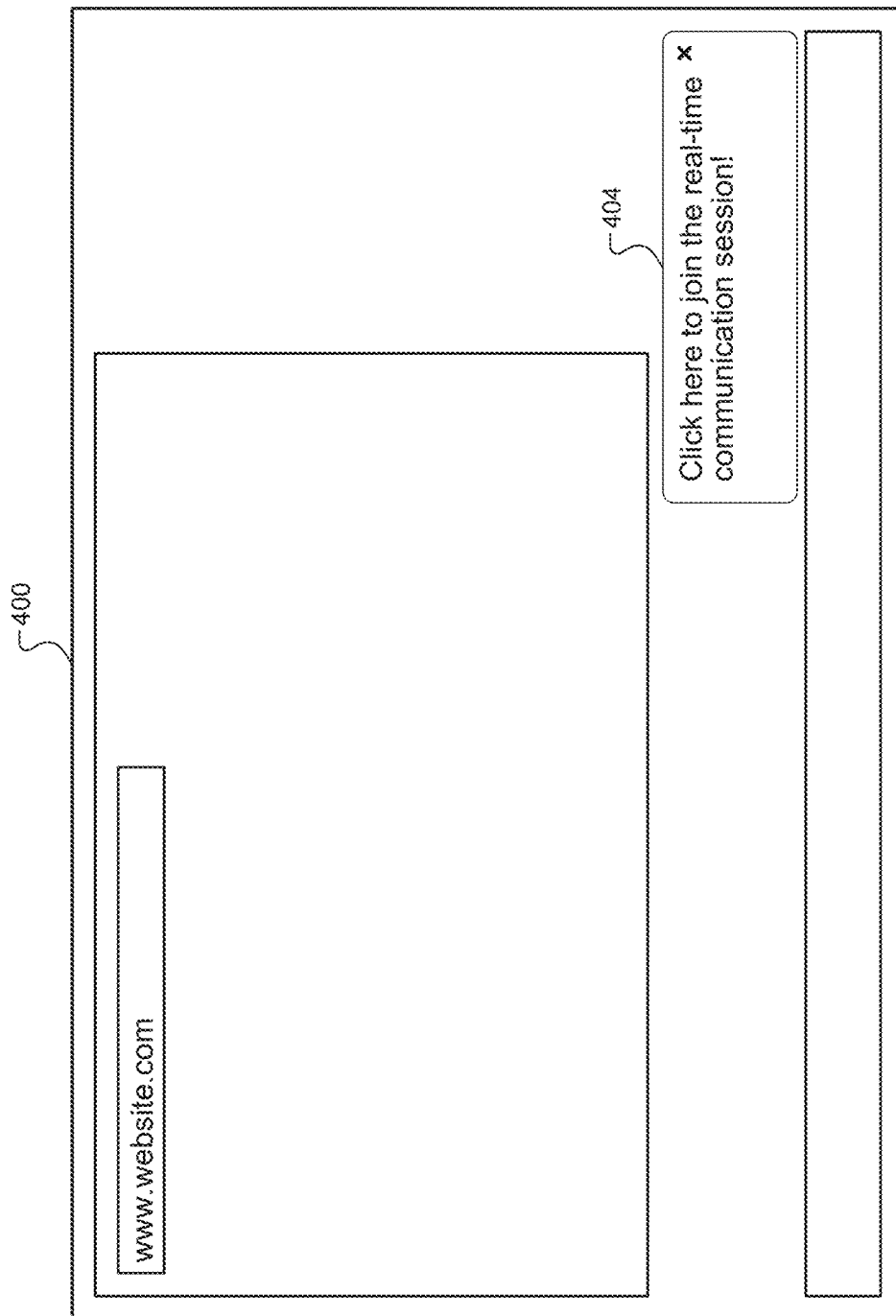
FIG. 4 is a diagram of an example user interface including an example user interface element according to some implementations of the present disclosure.

Referring now to FIG. 3, a flow diagram of an example technique 300 for automatic cross-device meeting authentication is illustrated. At 304, the server 148 can initialize, with the first computing device 124, a real-time communication session. At 308, the server 148 can receive, from at least one of the first computing device 124 and the mobile computing device 104, authentication information for the user 108. The authentication information can be indicative of the mobile computing device 104 being in short-range wireless communication with the first computing device 124. At 312, the server 148 can associate the user 108 with the real-time communication session. At 316, the server 104 can detect that the second computing device 112 is logged into a same account as the mobile computing device 104. In response to the associating and the detecting, at 320 the server 104 can transmit, to the second computing device 112, instructions that cause the second computing device 112 to display a user interface element associated with the real-time communication session. An example of the user interface element is a system tray notification or pop-up window, which is shown at 404 in an example user interface 400 of FIG. 4. Optionally, at 324 the server 148 can receive, from the second computing device 112, an input corresponding to a selection by the user 108 of the user interface element. The receipt of this input, for example, can enable the second computing device 112 to participate in the wireless communication session, including controlling the media system 132.

Further to the descriptions above, a user may be provided with controls allowing the user to make an election as to both if and when systems, programs or features described herein may enable collection of user information (e.g., information about a user's current location, or information about the user's current cellular account/billing plan), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMS, EEPROMS, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method comprising:
initializing, by a mobile computing device, a real-time meeting communication session between a user and one or more other users, wherein a participation of the user in the real-time meeting communication session is to begin via the mobile computing device of the user;
receiving information indicative of the mobile computing device of the user being present at a physical location of a first computing device;
causing the mobile computing device of the user at the physical location of the first computing device to display a user interface element, which when selected allows the participation of the user in the real-time meeting communication session to continue via the first computing device of the user at the physical location of the first computing device;
granting control of the real-time meeting communication session to the first computing device from the mobile computing device of the user at the physical location of the first computing device; and
allowing the user to participate in the real-time meeting communication session at the physical location of the first computing device upon a user selection of the user interface element.

2. The computer-implemented method of claim 1, further comprising:
receiving, from the mobile computing device, an input corresponding to the selection by the user of the user interface element.

3. The computer-implemented method of claim 2, wherein the receiving of the input causes the mobile computing device to participate in the real-time meeting communication session and to enable the mobile computing device to control, over an internet connection with a server, a media system coupled with the first computing device.

4. The computer-implemented method of claim 3, wherein the media system comprises a non-smart display, and wherein the first computing device is coupled to the non-smart display.

5. The computer-implemented method of claim 1, wherein the mobile computing device comprises at least one of a mobile phone, a tablet computer or a laptop computer.

6. The computer-implemented method of claim 1, wherein the first computing device is connected to the mobile computing device via a short-range wireless communication network and is connected to a server via a computing network, and wherein the user is associated with a second computing device that is connected to the server and lacks short-range wireless communication connection with the first computing device.

7. The computer-implemented method of claim 6, wherein the computing network comprises an Internet connection and the short-range wireless communication network comprises a Bluetooth connection.

8. The computer-implemented method of claim 1, wherein the user interface element comprises a system tray notification or a pop-up window and presents the mobile computing device with an option to join the real-time meeting communication session.

9. A system comprising:
memory storing a set of instructions;
one or more processors, coupled to the memory, to perform operations comprising:
initializing, by a mobile computing device, a real-time meeting communication session between a user and one or more other users, wherein a participation of the user in the real-time meeting communication session is to begin via the mobile computing device of the user;
receiving information indicative of the mobile computing device of the user being present at a physical location of a first computing device;
causing the mobile computing device of the user at the physical location of the first computing device to display a user interface element, which when selected allows the participation of the user in the real-time meeting communication session to continue via the first computing device of the user at the physical location of the first computing device;
granting control of the real-time meeting communication session to the first computing device from the mobile computing device of the user at the physical location of the first computing device; and
allowing the user to participate in the real-time meeting communication session at the physical location of the first computing device upon a user selection of the user interface element.

10. The system of claim 9, the operations further comprising:
receiving, from the mobile computing device, an input corresponding to the selection by the user of the user interface element.

11. The system of claim 10, wherein the receiving of the input causes the mobile computing device to participate in the real-time meeting communication session and to enable the mobile computing device to control, over an internet connection with a server, a media system coupled with the first computing device.

12. The system of claim 11, wherein the media system comprises a non-smart display, and wherein the first computing device is coupled to the non-smart display.

13. The system of claim 9, wherein the mobile computing device comprises at least one of a mobile phone, a tablet computer or a laptop computer.

14. The system of claim 9, wherein the first computing device is connected to the mobile computing device via a short-range wireless communication network and is connected to a server via a computing network, and wherein the user is associated with a second computing device that is connected to the server and lacks short-range wireless communication connection with the first computing device.

15. The system of claim 14, wherein the computing network comprises an Internet connection and the short-range wireless communication network comprises a Bluetooth connection.

16. The system of claim 9, wherein the user interface element comprises a system tray notification or a pop-up window and presents the mobile computing device with an option to join the real-time meeting communication session.

17. A non-transitory computer-readable medium having instructions stored thereon that, when executed by one or more processors, causes the one or more processors to perform operations comprising:
initializing, by a mobile computing device, a real-time meeting communication session between a user and one or more other users, wherein a participation of the user in the real-time meeting communication session is to begin via the mobile computing device of the user;

receiving information indicative of the mobile computing device of the user being present at a physical location of a first computing device;

causing the mobile computing device of the user at the physical location of the first computing device to display a user interface element, which when selected allows the participation of the user in the real-time meeting communication session to continue via the first computing device of the user at the physical location of the first computing device;

granting control of the real-time meeting communication session to the first computing device from the mobile computing device of the user at the physical location of the first computing device; and allowing the user to participate in the real-time meeting communication session at the physical location of the first computing device upon a user selection of the user interface element.

18. The non-transitory computer-readable medium of claim 17, the operations further comprising:

receiving, from the mobile computing device, an input corresponding to the selection by the user of the user interface element.

19. The non-transitory computer-readable medium of claim 18, wherein the receiving of the input causes the mobile computing device to participate in the real-time meeting communication session and to enable the mobile computing device to control, over an internet connection with a server, a media system coupled with the first computing device.

20. The non-transitory computer-readable medium of claim 17, wherein the first computing device is connected to the mobile computing device via a short-range wireless communication network and is connected to a server via a computing network, and wherein the user is associated with a second computing device that is connected to the server and lacks short-range wireless communication connection with the first computing device.

* * * * *